(12) United States Patent
Shannon

(10) Patent No.: US 6,256,585 B1
(45) Date of Patent: Jul. 3, 2001

(54) METHOD FOR MEASURING DEPTHS OF A WATERWAY AND FOR DETERMINING VERTICAL POSITIONS OF A WATERBORNE VESSEL

(75) Inventor: Brian F. Shannon, Fairfax, VA (US)

(73) Assignee: U.S. Army Corps of Engineers as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/418,367

(22) Filed: Oct. 14, 1999

(51) Int. Cl.[7] .................................................. G01V 7/00
(52) U.S. Cl. .................................................. 702/2; 702/16
(58) Field of Search ........................................... 702/2, 16

(56) References Cited

U.S. PATENT DOCUMENTS

| | | |
|---|---|---|
| 5,323,322 * | 6/1994 | Mueller et al. .......................... 702/2 |
| 5,386,368 | 1/1995 | Knight .................................. 364/432 |
| 5,452,216 * | 9/1995 | Mounce .................................... 702/2 |
| 5,689,475 * | 11/1997 | Chaumet-Lagrange ................ 367/88 |
| 5,884,213 * | 3/1999 | Carlson ................................. 701/206 |
| 5,884,219 | 3/1999 | Curtwright et al. ................. 701/213 |
| 5,933,110 | 8/1999 | Tang et al. ....................... 342/357.11 |

* cited by examiner

*Primary Examiner*—Christine Oda
*Assistant Examiner*—Victor J. Taylor
(74) *Attorney, Agent, or Firm*—John MacEvoy

(57) ABSTRACT

A method for measuring depths of a waterway, including the steps of determining nautical chart vertical reference values along a selected waterway, building a data base of the reference values and storing the data base in a computer accessible from the vessel, providing a radio receiver onboard the vessel and Global Positioning System (GPS) equipment accessible from the vessel, and operating the computer, radio receiver, and GPS equipment to continuously obtain positions of the vessel horizontally, and computations as to depth of the vessel above a pertinent vertical reference value.

4 Claims, 4 Drawing Sheets

```
┌─────────────────────────────────────────────────────────────┐
│ DETERMINE NAUTICAL CHART VERTICAL REFERENCE VALUES          │
│            ALONG A SELECTED WATERWAY                        │
└─────────────────────────────────────────────────────────────┘
                              │
┌─────────────────────────────────────────────────────────────┐
│ BUILD DATA BASE OF REFERENCE VALUES AND STORE SAME          │
│ IN A COMPUTER ACCESSIBLE FROM A VESSEL TRAVERSING           │
│                     THE WATERWAY                            │
└─────────────────────────────────────────────────────────────┘
                              │
┌─────────────────────────────────────────────────────────────┐
│   PROVIDE GPS EQUIPMENT ACCESSIBLE FROM THE VESSEL          │
│        AND A RADIO RECEIVER ONBOARD THE VESSEL              │
└─────────────────────────────────────────────────────────────┘
                              │
┌─────────────────────────────────────────────────────────────┐
│     OPERATE THE GPS EQUIPMENT TO CONTINUOUSLY               │
│     OBTAIN POSITIONS OF THE VESSEL HORIZONTALLY             │
└─────────────────────────────────────────────────────────────┘
                              │
┌─────────────────────────────────────────────────────────────┐
│  OPERATE THE RADIO RECEIVER AND THE COMPUTER IN             │
│  CONJUNCTION WITH THE GPS EQUIPMENT TO OBTAIN TIDAL         │
│  DATA AND COMPUTATIONS AS TO DEPTH OF THE VESSEL            │
└─────────────────────────────────────────────────────────────┘
                              │
┌─────────────────────────────────────────────────────────────┐
│   PLOT THE COMPUTED DEPTH DATA ON A NAUTICAL CHART          │
└─────────────────────────────────────────────────────────────┘
```

*FIG. 1*

DETERMINE NAUTICAL CHART VERTICAL REFERENCE VALUES ALONG A SELECTED WATERWAY

BUILD DATA BASE OF REFERENCE VALUES AND STORE SAME IN A COMPUTER ACCESSIBLE FROM A VESSEL TRAVERSING THE WATERWAY

PROVIDE GPS EQUIPMENT ACCESSIBLE FROM THE VESSEL AND A RADIO RECEIVER ONBOARD THE VESSEL

OPERATE THE COMPUTER, THE GPS EQUIPMENT, AND THE RADIO RECEIVER TO CONTINUOUSLY OBTAIN DATA ON CURRENT HORIZONTAL AND VERTICAL POSITIONS OF THE VESSEL

*FIG. 2*

METHOD FOR MEASURING DEPTHS OF A WATERWAY AND FOR DETERMINING VERTICAL POSITIONS OF A WATERBORNE VESSEL

BACKGROUND OF THE INVENTION

1. Field of the Invention

This invention relates to hydrographic surveys and is directed more particularly to a method for determining on a continuous basis, the height of water above a chart datum as a survey vessel performs hydrographic surveys in a waterway, to provide more accurate depth data.

2. Description of the Prior Art

The traditional method of coastal hydrographic surveying relies on a tide gauge, i.e., a water level gauge. The tide gauge records water heights at a selected specified time interval, usually 6 or 10 minutes. A tide staff and a human recorder may also be used to record the tide at the selected specified time interval. The time indexed tide is subtracted from time indexed soundings to provide data for bathymetric maps, or nautical charts.

Tide (coastal projects) and stage (river projects) are vertical measurements relative to a specific water level in a navigation channel. Typically, the vertical reference is a low water event in order to maintain the minimum depth capable of transporting a vessel safely to port. The vertical measurements are recorded by a tide gauge at a specific period of time. Since the number of gauges are limited, water levels are modeled from the gauge, up and downstream, at a distance from the gauge. These modeled water levels, called "Tidal Zoning" are used to reduce soundings measured in a channel to a common reference, or chart datum. The problem with this approach is the use of averaged parameters. The parameters are "time" and "height" change at a distance from the gauge. Wind and changes in atmospheric pressure disrupt the average ambient conditions which, in turn, cause the models to provide false water level relationships during a hydrographic survey. Hydrographic surveys relative to a tide gauge develop ever increasing errors as the survey vessel travels away from the tide gauge. The disparities are of greater magnitude in areas that have a large range of tide.

Vessels maneuvering through a waterway typically use acoustic transducer depth-determining devices in an effort to ascertain hull clearance above a channel bottom. Unfortunately, the configuration and depth of the channel bottom varies because of shoaling. To compensate for vagaries in channel bottom depths, vessels frequently are loaded short of a full load to allow for a higher vessel bottom position above the channel bottom.

Accordingly, there is a need for improved vertical position data for vessels traversing waterways, so as to facilitate more accurate hydrographic surveys, which will produce more accurate indications onboard waterborne vessels as to the clearance beneath the keel of the vessel to the published channel depth.

SUMMARY OF THE INVENTION

It is therefore an object of the invention to provide a method for consistently providing hydrographic survey results.

A further object of the invention is to provide a method for more accurately determining, on a continuing basis, clearance between the bottom of a waterborne vessel and the bottom of a waterway thereunder, such that the vessel may be loaded for disposition closer to the clearance limits of the waterway.

With the above and other objects in view, as will hereinafter appear, a feature of the present invention is the provision of a method for plotting depths of a waterway, the method comprising the steps of determining nautical chart vertical reference values along a selected waterway, building a data base of the reference values and storing the data base in a computer accessible from a vessel traversing the waterway, and providing Global Positioning System (GPS) equipment accessible from the vessel and a radio receiver onboard the vehicle. The method further comprises operating the GPS equipment to continuously obtain positions of the vessel horizontally, operating the radio receiver and computer in conjunction with the GPS equipment to continuously obtain tidal data from the data base, and computations as to depth of the vessel beneath the vertical reference value, and plotting the depth data on a nautical chart.

In accordance with a further feature of the invention, there is provided a method for determining keel clearance of a waterborne vessel traversing a waterway, the method comprising the steps of providing a data base of tidal datum measurements and storing the data base in a computer accessible from the vessel, providing GPS equipment accessible from the vessel and a radio receiver onboard the vessel, operating the GPS equipment to continuously obtain positions of the vessel horizontally, and operating the radio receiver and computer in conjunction with the GPS equipment to continuously obtain the tide at the vessel's position in the waterway.

In accordance with a further feature of the invention, there is provided a method for providing a data base of nautical chart vertical reference values along the waterway and storing the data base in a computer accessible from the vessel, providing a radio receiver onboard the vessel and GPS equipment accessible from the vessel, operating the GPS equipment to continuously obtain positions of the vessel horizontally, operating the radio receiver and computer in conjunction with the GPS equipment to continuously obtain tidal data from the data base, and subtracting the draft of the vessel plus antenna height above waterline to obtain below keel clearance of the vessel relative to the chart datum.

In accordance with a still further feature of the invention, there is provided a method for determining vertical positions of a waterborne vessel's waterline above the chart datum at the vessel's present horizontal location in a waterway, the method comprising the steps of determining nautical chart vertical reference values along a selected waterway, building a data base of the reference values and storing the data base in a computer accessible from the vessel, providing GPS equipment accessible from the vessel, and a radio receiver onboard the vessel and adapted to receive kinematic carrier GPS corrections, and operating the computer, the GPS equipment, and the radio receiver, to continuously obtain data on current horizontal and vertical positions of the vessel.

The above and other features of the invention, including various novel details of combinations of steps, will now be more particularly described with reference to the accompanying drawings and pointed out in the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 1 is a chart depicting a method for plotting depths of a waterway, illustrative of an embodiment of the invention;

FIG. 2 is similar to FIG. 1, but illustrative of a method for determining vertical positions of a vessel at various horizontal positions thereof in a waterway;

DESCRIPTION OF THE PREFERRED EMBODIMENT

Figure 3:
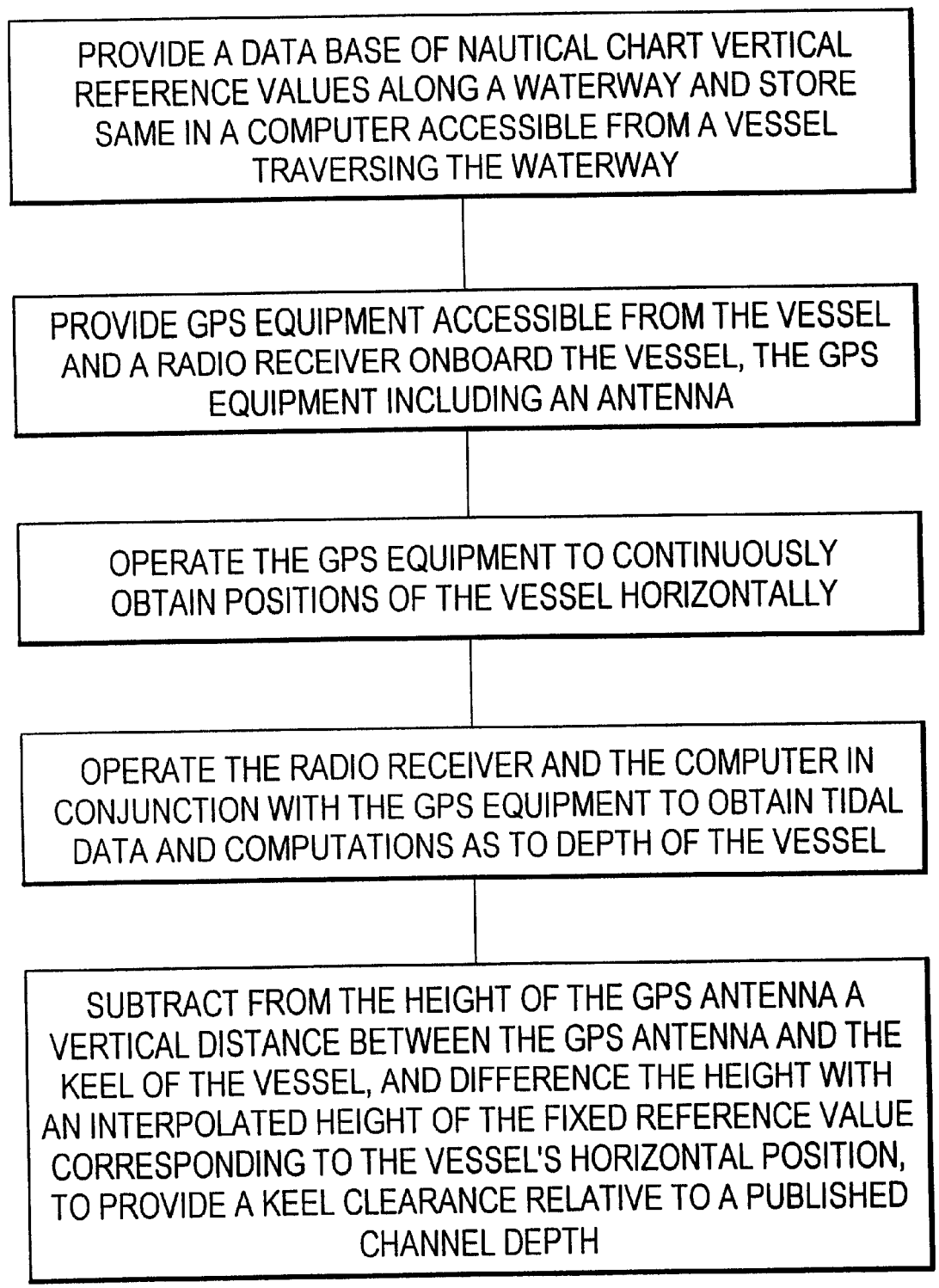
FIGS. 3 and 4 are similar to FIG. 1, but illustrative of methods for determining under keel clearance of a vessel in a waterway.
Figure 4:
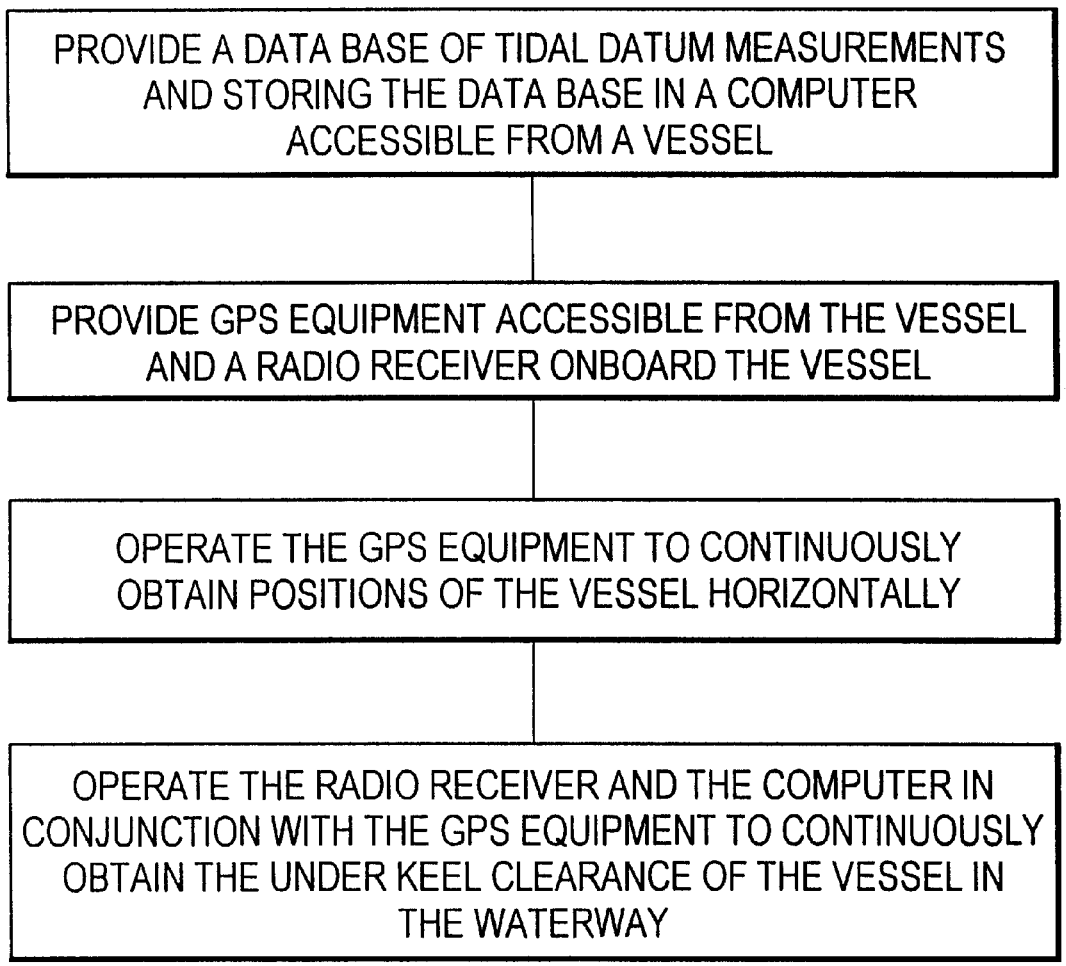

The method disclosed herein consistently provides improved hydrographic survey results. The invention includes, firstly, a fixed vertical reference for a navigation project, and the survey results are determined relative to the fixed reference. The methods disclosed herein provide automatically calculated tides or river stages (hereinafter, tides) at a waterborne vessel's current position as the vessel traverses the waterway. The new methods consistently apply tidal corrections appropriate for the vessel's horizontal positions as determined by the GPS, a system known and used internationally.

The hydrographic survey methods disclosed herein are practiced without the use of a tide gauge. Models that depend on time and position from a tide gauge are not used.

In accordance with the invention, nautical chart vertical reference values are determined along a selected waterway using a floating platform with GPS equipment, a GPS reference station with a known position in three dimensions, and a tide gauge in the waterway. The reference values obtained from the floating platform are stored in a computer as a data base. In the United States, the data base contains tide relative to the Mean Lower Low Water (MLLW), the chart datum of the United States.

The vertical references can be obtained by a selected one of known methods, one of which is disclosed in "Tidal Datum Planes" H. A. Marmer, Sp. Pub. No. 135, Revised (1951) Edition, Coast and Geodetic Survey, U.S. Dept. of Commerce.

The particular vessel concerned is measured with respect to (a) height from the GPS antenna phase center to the keel, and (b) height from the GPS antenna phase center to the waterline at a selected loading of the vessel. The results of such measurements are consigned to the aforesaid data base.

The waterborne vessel is provided with a radio receiver and GPS equipment and computer or, alternatively, is in communication with accessible GPS equipment and a computer. Once the data base is compiled, any ship with an appropriate radio receiver and having access to the data base on the GPS equipment, can be advised of the tide on a broadcast time interval, usually every second.

A data base can be compiled for every major channel. The reference values should remain valid for twenty years, or so, as long as there is no significant subsidence, uplift, or hydraulic change in the waterway.

With the computer, with the aforementioned data base stored therein, GPS equipment, and radio receiver in place, all are operated substantially simultaneously from onboard the waterborne vessel, providing for the vessel data on the current tide relative to the vertical reference values at current GPS-determined horizontal positions.

More particularly, the invention provides an improved method for plotting depths of a waterway by operating the radio receiver and computer in conjunction with the GPS equipment to continuously obtain tidal data and computations as to depths of the waterway beneath a vessel, and plotting the depths on a navigational chart, or storing the depths for future transposing to the navigational charts.

Inasmuch as the reference values are fixed, all hydrographic surveys so conducted are substantially more reliable. For a detailed discussion of hydrographic surveys, see U.S. Army Corps. of Engineers "Engineer Manual of Hydrographic Surveying" EM-1110-2-1003, Oct. 31, 1994.

In operation of the new method, a waterborne vessel transversing a waterway can operate the radio receiver and computer in conjunction with the GPS equipment to continuously obtain tidal data from the data base and computation from the computer as to depths of the waterway, and can obtain the below keel clearance of the vessel to the published channel clearance by subtraction of the draft of the vessel from the computed depths of the waterway.

The new method provides to the vessel, on a continuing basis, the waterway clearance relative to the vessel's hull, including changing tidal conditions, as the vessel traverses the waterway. Ship lines using deep draft vessels benefit by the new method by being able to load closer to the clearance limits of a waterway.

There is thus provided a new method for determining depths along a waterway, and more particularly, for thereby (1) improving hydrographic surveys, and (2) improving reliability of under keel clearance, enabling increased loading of deep draft vessels. The new method can further be used to measure depth before and after a dredging operation, to determine the bulk of material removed in a dredging exercise.

It will be understood that many additional changes in the details and arrangement of steps, which have been herein described and illustrated in order to explain the nature of the invention, may be made by those skilled in the art within the principles and scope of the invention as expressed in the appended claims.

What is claimed is:

1. A method for removing tidal fluctuations from a hydrographic survey of a waterway, the method comprising the steps of:

determining nautical chart vertical reference values along a selected waterway;

building a data base of the reference values and storing the data base in a computer accessible from a vessel traversing the waterway;

providing Global Positioning System (GPS) equipment accessible from the vessel and a radio receiver onboard the vessel;

operating the GPS equipment to continuously obtain positions of the vessel horizontally;

operating the radio receiver and the computer in conjunction with the GPS equipment to continuously obtain tidal data from the data base, and obtain computations as to depth of the vessel beneath a pertinent one of the vertical reference values; and plotting the computed depth data on a nautical chart.

2. A method for determining vertical positions of a waterborne vessel's waterline above a chart datum at the vessel's present horizontal location in a waterway, the method comprising the steps of:

determining nautical chart vertical reference values along a selected waterway;

building a data base of the reference values and storing the data base in a computer accessible from the vessel;

providing Global Positioning System (GPS) equipment accessible from the vessel, and a radio receiver onboard the vessel and adapted to receive kinematic carrier GPS corrections; and operating the computer, the GPS equipment, and the radio receiver, to continuously obtain data on current horizontal and vertical positions of the vessel.

3. A method for determining under keel clearance of a waterborne vessel traversing a waterway, the method comprising the steps of:

providing a data base of nautical chart vertical reference values along the waterway and storing the data base in a computer accessible from the vessel;

providing Global Positioning System (GPS) equipment accessible from the vessel and a radio receiver onboard the vessel, said GPS equipment including a GPS antenna mounted on the vessel;

operating the GPS equipment to continuously obtain positions of the vessel horizontally;

operating the radio receiver and computer in conjunction with the GPS equipment to continuously obtain tidal data from the data base and computations as to depths of the waterway; and subtracting from the height of the GPS antenna a vertical distance between the GPS antenna height and the keel of the vessel and differencing the height with an interpolated height of the fixed reference value corresponding to the vessel's horizontal position, to provide a keel clearance relative to a published channel depth.

4. A method for storing keel clearances of a waterborne vessel traversing a waterway, the method comprising the steps of:

providing a data base of tidal datum measurements and storing the data base in a computer accessible from the vessel;

providing GPS equipment accessible from the vessel and a radio receiver onboard the vessel;

operating the Global Positioning System (GPS) equipment to continuously obtain positions of the vessel horizontally;

operating the radio receiver and computer in conjunction with the GPS equipment to continuously obtain the under keel clearance of the vessel in the waterway; and, storing the under keel clearances in an electronic log of the vessel.

* * * * *